(12) United States Patent
Ravi (10) Patent No.: US 10,460,018 B1
(45) Date of Patent: Oct. 29, 2019

(54) SYSTEM FOR DETERMINING LAYOUTS OF WEBPAGES

(71) Applicant: AMAZON TECHNOLOGIES, INC., Seattle, WA (US)

(72) Inventor: Lohith Ravi, Kirkland, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/665,006

(22) Filed: Jul. 31, 2017

(51) Int. Cl.
  *G06F 17/00* (2006.01)
  *G06F 17/22* (2006.01)
  *G06F 17/21* (2006.01)
  *H04L 29/08* (2006.01)

(52) U.S. Cl.
  CPC ........ *G06F 17/2247* (2013.01); *G06F 17/211* (2013.01); *H04L 67/02* (2013.01)

(58) Field of Classification Search
  None
  See application file for complete search history.

(56) References Cited

U.S. PATENT DOCUMENTS

| | | | | |
|---|---|---|---|---|
| 8,935,249 | B2* | 1/2015 | Traub | G06F 17/30657 707/737 |
| 9,372,838 | B2* | 6/2016 | Gupta | G06F 17/30908 |
| 2006/0253476 | A1* | 11/2006 | Roth | G06F 17/2211 |
| 2007/0005340 | A1* | 1/2007 | Goutte | G06F 16/355 704/9 |
| 2008/0140645 | A1* | 6/2008 | Denoual | G06F 17/2229 |
| 2008/0155701 | A1* | 6/2008 | Martinez | G06F 21/10 726/27 |
| 2009/0125529 | A1* | 5/2009 | Vydiswaran | G06F 17/30569 |
| 2009/0216708 | A1* | 8/2009 | Madaan | G06F 17/3071 |
| 2010/0313149 | A1* | 12/2010 | Zhang | G06F 17/30893 715/760 |
| 2012/0232788 | A1* | 9/2012 | Diao | G01C 21/20 701/426 |
| 2012/0239598 | A1* | 9/2012 | Cascaval | G06F 17/30899 706/12 |
| 2013/0031461 | A1* | 1/2013 | Hou | G06F 17/30536 715/234 |

(Continued)

OTHER PUBLICATIONS

Crescenzi, et al., "Clustering Web Pages Based on Their Structure", Department of Computer Science, University of Manchester. Data & Knowledge Engineering, vol. 54, Issue 3, Sep. 2005, pp. 279-299. Retrieved from the Internet: <https://www.sciencedirect.com/science/article/pii/S0169023X04002137>.

*Primary Examiner* — Mustafa A Amin
(74) *Attorney, Agent, or Firm* — Lindauer Law, PLLC (57) ABSTRACT

Described are techniques for automatically grouping webpages based on common layout characteristics without requiring presentation of the webpages. The relationships between HTML elements or other types of nodes in a webpage may be used to generate aliases for each node. Each alias represents a particular relationship or combination of relationships between the node and one or more other nodes. This process may be repeated for each webpage in a website, then the matching aliases between webpages may be determined. Based on the matching aliases between webpages, the webpages that share a large number of common aliases may be grouped into a cluster of webpages having common layout characteristics.

20 Claims, 6 Drawing Sheets

(56) References Cited

U.S. PATENT DOCUMENTS

| | | | |
|---|---|---|---|
| 2013/0283148 A1* | 10/2013 | Lim | G06F 17/2247 715/234 |
| 2014/0164352 A1* | 6/2014 | Denninghoff | H03H 9/02622 707/711 |
| 2018/0191790 A1* | 7/2018 | Kanzaki | H04L 65/403 |

* cited by examiner

SYSTEM FOR DETERMINING LAYOUTS OF WEBPAGES

BACKGROUND

When extracting data from multiple webpages, such as when performing a data scraping operation, the layout of a webpage may affect the algorithms used to extract data from selected nodes of the webpage.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

A website may include multiple webpages, each webpage having different data located in different places within the webpage. For example, a webpage within an online marketplace that describes a first type of item available for purchase may have different layout characteristics than a webpage associated with a different category of item. As another example, webpages used to describe shipping options and webpages used to modify user profiles may have different layout characteristics than webpages used to describe items for purchase. In some cases, an operation to extract selected data from a website, sometimes referred to as a data scraping operation, may be performed. For example, an electronics manufacturer may wish to begin offering products for sale through a third party online marketplace. The manufacturer may request that a user associated with the online marketplace perform a data scraping operation on the manufacturer's website to extract data that may be useful when offering products for sale through the online marketplace, then populate webpages of the online marketplace with the extracted data. A website associated with the electronics manufacturer may include multiple webpages, from which the title, price, and technical specifications of various items available for purchase may be extracted. However, various webpages within the manufacturer's website may have different layout characteristics, such that an extraction algorithm used to locate and extract a product name and price from a first webpage may not effectively locate and extract the product name and price from a second webpage having different layout characteristics. To account for the different layout characteristics of each webpage, a user may manually view the webpages and determine a suitable extraction algorithm to target data located in selected nodes of each webpage. However, the manual determination of this information may utilize extensive time and resources. For example, a manual process performed by a user may include rendering and viewing each webpage associated with the manufacturer's website, then generating an extraction algorithm for use with a particular webpage and possibly other webpages having the same layout characteristics as the particular webpage. The extraction algorithm may be used to locate and store selected data from each webpage, based on the layout of the webpage. For example, an extraction algorithm configured to extract the price of items from one or more webpages may be configured to access a node at a particular location within the webpage, then retrieve the value from the node. However, the extraction algorithm used for a particular webpage may not successfully locate and extract corresponding information from other webpages having different layout characteristics. To account for this situation, a user may typically generate a specific extraction algorithm for each node of each webpage, or for each group of webpages having identical or similar layout characteristics. Determining whether multiple webpages have a layout that is sufficiently similar to enable the same extraction algorithm to extract values from corresponding nodes within the webpages may include manually rendering and viewing each webpage, followed by a subjective determination by a user regarding the similarity of the layout characteristics of the webpages.

Described in this disclosure are techniques for automatically determining webpages that have identical or similar layout characteristics, in some cases without rendering or presenting the webpages, based on the underlying hypertext markup language (HTML) code or other elements within the webpages. For example, a website may include multiple dynamic webpages that include different content based on the user that is accessing the webpage, or other characteristics. Continuing the example, a user accessing a webpage describing an item available for purchase may also be presented with links within the webpage to access other items based on that user's purchase history, search history, or browsing history. In addition to dynamic elements within webpages, which may frequently change, in some cases, static elements may also vary between different webpages. For example, in a webpage associated with a first category of items, a button to add the item to an electronic shopping cart may be positioned in a first location, while in a webpage associated with a second category, the button may be positioned in a different location due to the inclusion of an expanded table of product colors, technical characteristics, or other features not associated with the first category. However in many cases, webpages that serve a similar purpose, such as the presentation of items available for purchase, may also include multiple common layout elements. For example, webpages that present items for purchase may include a product name, price, and technical specifications located at the same position within the webpages, even though the presence, absence, and location of other elements included in the webpage may change.

Each webpage may be described as a collection of HTML nodes. For example, a webpage may be described using a document object model (DOM) representation, such as a tree structure, having multiple nodes associated with other nodes via various relationships. For example, nodes may be associated with other nodes via parent-child relationships, sibling relationships, and more distant relationships. Nodes may also be associated with other nodes based on the distance between the nodes. As such, each node within a tree may be located or described using various characteristics of the node. For example, a first node "X" may be the child of a parent node "P", the parent of a child node "C", the grandchild of a grandparent node "GP", and the sibling of a first-level sibling node "S". Therefore, the node "X" may be described using numerous aliases representative of each relationship or combination of relationships. Continuing the example, the node "X" may be described as: 1) A child of "P"; 2) A child of "GP"; 3) A child of both "P" and "GP"; 4) A parent of "C"; 5) A child of "P" and a parent of "C"; 6) A child of "GP" and a parent of "C"; 7) A child of both "P" and "GP" and a parent of "C"; 8) A sibling of "S"; 9) A child of "P" and a sibling of "S"; 10) A child of "GP" and a sibling of "S"; 11) A child of both "P" and "GP" and a sibling of "S"; 12) A parent of "C" and a sibling of "S"; 13) A child of "P", a parent of "C", and a sibling of "5"; 14) A child of "GP", a parent of "C", and a sibling of "S"); and 15) A child of both "GP" and "P", a parent of "C", and a sibling of "S".

For each node in a webpage, multiple aliases may be generated, each alias being indicative of a relationship between the node and at least one other node in the webpage. In some implementations, the aliases generated for a node may include each possible expression of a relationship between that node and other nodes. In some cases, the generation of aliases may be limited to a threshold distance or a threshold level of relationship. For example, direct parent-child relationships may be used to generate aliases, while more distant grandparent and grandchild relationships may be disregarded. This process may be repeated with each webpage in a website, or in some implementations, a subset of the webpages for which a data extraction operation is to be performed. Thus, each resulting webpage may be defined by a series of aliases for each node within the webpage, where each of the aliases describes a relationship of the corresponding node to at least one other node.

After generating aliases for each node of each webpage for which data extraction is to be performed, the aliases for each webpage may be compared to one another to determine matching aliases that are common among various webpages. A first webpage having a large number of aliases that match the aliases associated with a second webpage is more likely to have similar layout characteristics to the second webpage than a webpage for which a small number of aliases match those of the second webpage. For example, two webpages associated with items available for purchase may include a node "X" that contains the price of the item described in the webpage. In a first webpage, the node "X" may be a child of a parent node "P" and a parent of a child node "C". In the second webpage, a dynamic element, such as the parent node "P" may not be present, and the second webpage may include a node "X" that is a parent of the child node "C". In this case, each alias for node "X" in the first webpage that referenced a relationship between "X" and "C" and did not reference the parent node "P" would match an alias of the second webpage. Each alias for node "X" that did not reference "C" or that referenced a relationship with "P" would not match an alias of the second webpage.

If a group of webpages each match more than a threshold quantity of aliases with one another, such as 60 percent of the aliases for a webpage matching each other webpage within the group, the group of webpages may be associated with a cluster of webpages. Due to the large number of matching aliases between each webpage of a cluster, the webpages that are grouped within the same cluster will most likely have identical or similar layout characteristics. In some cases, a webpage may match more than a threshold quantity of aliases with webpages in multiple clusters. In such a case, the webpage may be grouped with the cluster of webpages for which a larger portion of aliases are matched. In some implementations, one or more nodes or aliases may be disregarded when matching the aliases of webpages to those of other webpages. For example, if a particular node or alias is common among a threshold number of webpages within a website, such as 90 percent of the webpages, this may indicate that the particular node or alias relates to information that is not useful for differentiating the layout characteristics of the webpages. For example, a node that is common to every webpage in a website may relate to header or footer information, the name of a company, or other types of data that may be presented on a large number of webpages and may not be useful for differentiating the layout characteristics of different webpages.

In some implementations, the aliases that are generated may be based on selected relationships with one or more target nodes indicated by user input. For example, a user accessing one or more webpages, may indicate particular data that is to be extracted from the webpage. Continuing the example, a user may indicate a product name and price within a webpage describing an item available for purchase. The aliases that are generated may then correspond to relationships between the selected nodes indicated by user input and each other node within the respective webpage(s). Subsequently, the aliases that correspond to the selected node may be compared with the aliases in other webpages. The particular aliases that correspond to the nodes that are common to the largest number of webpages may subsequently be used as part of a data extraction algorithm to locate and access the data corresponding to the selected node in each webpage.

In other implementations, other types of aliases may be used to group webpages into clusters. For example, if multiple webpages include the same JavaScript element, this may indicate that the webpages have similar layout characteristics independent of or in addition to common aliases between HTML nodes of the webpages. As another example, if multiple webpages include the same or similar uniform resource locator (URL) identifiers, this correspondence may indicate that the webpages have similar layout characteristics. Continuing the example, two webpages within the same website that are identified using similar URL paths may be a similar category or type of webpage. In some implementations, the different aliases for a node that are generated may be weighted differently when determining the extent to which the aliases of a first webpage match the aliases of other webpages. For example, matching JavaScript elements may be weighted more heavily than matching HTML node aliases, which may be weighted more heavily than matching URL identifiers. As another example, matching aliases that relate to close relationships between nodes, such as a direct parent-child relationship, may be weighted more heavily than sibling relationships or more distant grandparent or grandchild relationships.

After grouping one or more webpages into clusters of webpages that may have identical or similar layout characteristics, an output indicative of the cluster(s) may be generated. For example, after identifying multiple webpages having similar layout characteristics using the process described previously, a user may access a single webpage with a cluster and generate an extraction algorithm, such as an extensible markup language (XML) path or similar tool for locating a node and determining the data associated with the node, that may be used to extract data from one or more desired nodes of the webpages within the cluster. In some implementations, if the count of determined clusters is larger than a threshold count, the process may be repeated using a smaller threshold value associated with the matching of aliases, so that a larger number of webpages may be grouped within the same clusters. In other implementations, if the count of determined clusters is larger than a threshold minimum or if a data scraping process does not successfully extract one or more values from each webpage within a cluster, the process may be repeated using a larger threshold value, so that webpages having a smaller number of matching aliases are not associated with the same cluster.

Figure 1:
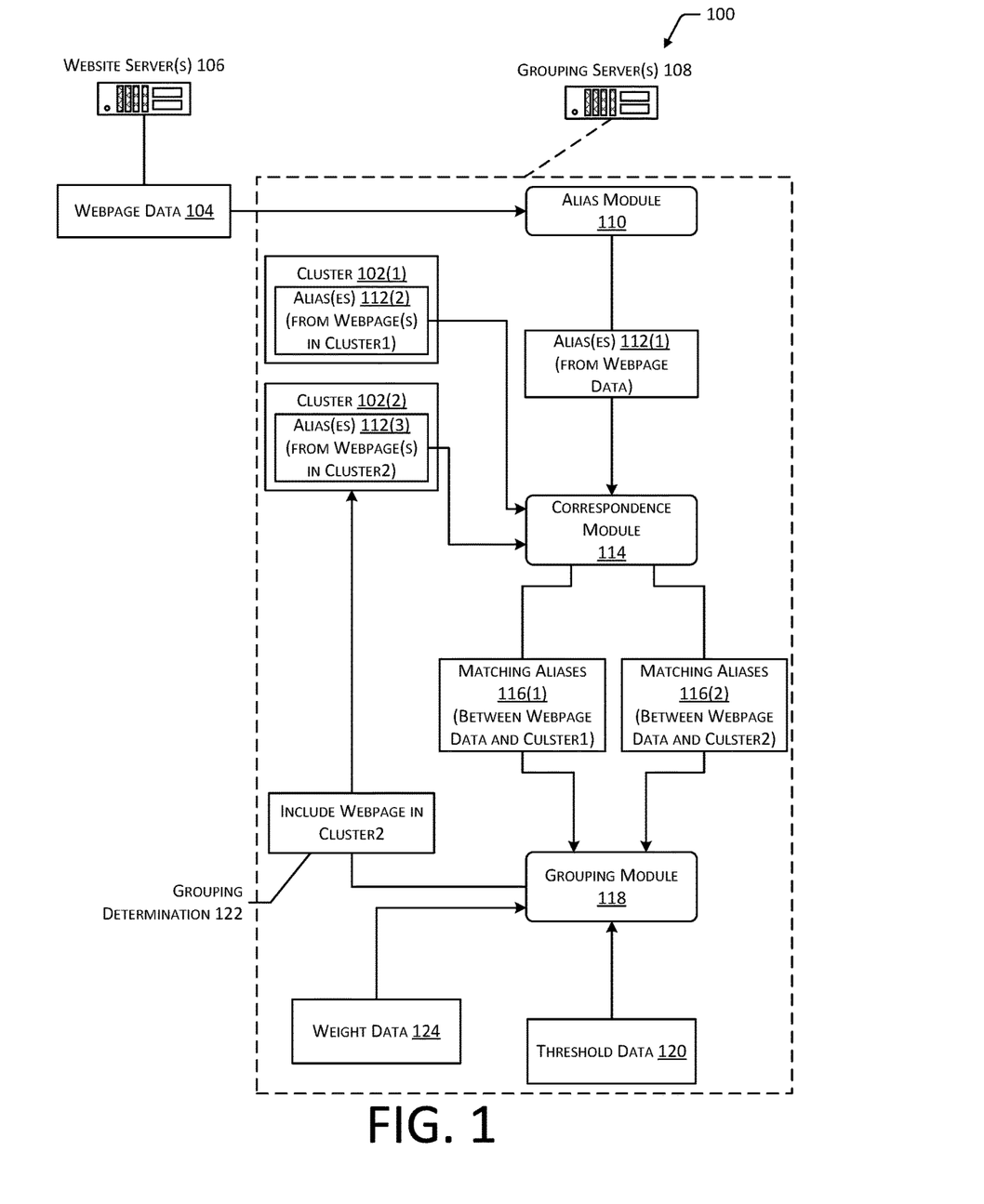
FIG. 1 depicts an implementation of a system for automatically grouping webpages into clusters based on the webpage data that affects the layout characteristics of the webpages.

FIG. 1 depicts an implementation of a system 100 for automatically grouping webpages into clusters 102 based on webpage data 104 that affects the layout characteristics of the webpages. For example, one or more website servers 106 may store webpage data 104 indicative of one or more webpages. The webpage data 104 may include data that may be rendered or otherwise processed, such as by a browser, to cause presentation of a webpage to a user. At least a portion of the webpage data 104 may affect the layout characteristics of the webpage. For example, webpage data 104 may cause one or more of alphanumeric data, image data, or video data to be output at a specific location on a display device, or at a location relative to the location of other content within the webpage. Webpage data 104 may also cause audio data, haptic data, and other types of data to be presented. For example webpage data 104 may include one or more of HTML, dynamic HTML, XML, JavaScript, or any other type of code, instructions, data, and so forth that may be processed by a browser or another type of module to cause output of a webpage.

In some implementations, the webpage data 104 may be represented as a tree structure having one or more nodes, each of which is related to at least one other node. For example, HTML data used to generate a webpage may be represented as DOM tree structure in which each node of the tree structure may store a value. Continuing the example, webpage data 104 may include HTML elements, each of which may be contained within a parent element and may in turn contain one or more child elements. Some of the node data may describe the properties of the node, such as the parent, child, and sibling, relationships of the node, the name of the node, and so forth. Other node data may include values that may be extracted, such as alphanumeric data indicative of webpage content.

While FIG. 1 depicts the website server(s) 106 as a single server, the website server(s) 106 may include any number and any type of computing device capable of storing webpage data 104 and transmitting the webpage data 104 to other computing devices. For example, the website server(s) 106 may include, without limitation, one or more servers, personal computers (e.g., desktop or laptop computers), portable computing devices (e.g., smartphones, notebooks, tablet computers, palm-top computers), wearable computing devices, automotive computing devices, gaming systems, smart televisions, set-top boxes, and so forth. The website server(s) 106 may store webpage data 104 relating to any number of webpages. For illustrative purposes, the webpage data 104 shown in FIG. 1 may correspond to a single webpage within a website that includes multiple webpages. Additional webpage data 104 for each webpage of a website may also be stored in the website server(s) 106.

To extract data from a webpage, a user may typically generate a path or other type of algorithm that indicates the location of a node, within the webpage data 104, that contains a value to be extracted. The path or algorithm that is used may depend on the layout characteristics of the webpage, which in many cases, may be manually viewed by the user that is generating the algorithm. In some cases, an extraction algorithm for a first webpage may be used to extract the same type of values from other webpages having similar layout characters. To determine whether the layout characteristics of multiple webpages are sufficiently similar to enable a single algorithm to be used to extract corresponding values from each of the multiple webpages, a user may view each webpage and subjectively make this determination.

In contrast, the system 100 of FIG. 1 may automatically categorize webpages into groups of webpages having similar layout characteristics, which may be referred to as clusters 102. For example, FIG. 1 depicts a first cluster 102(1) and a second cluster 102(2), each of which may include any number of webpages having similar layout characteristics. Specifically, FIG. 1 illustrates one or more grouping servers 108, which may receive the webpage data 104 from the website server(s) 106 and determine whether the webpage data 104 represents a webpage having layout characteristics similar to the webpages of an existing cluster 102, or whether no similar cluster 102 exists and a new cluster 102 that includes the webpage data 104 may be generated. The grouping server(s) 108 may include any number and any type of computing devices including, without limitation, the types of computing devices described with regard to the website server(s) 106. Additionally, while FIG. 1 depicts the website server(s) 106 and grouping server(s) 108 as separate devices, in some implementations, a single computing device or group of computing devices may perform any of the functions described with regard to the webpage server(s) 106 or grouping server(s) 108.

An alias module 110 associated with the grouping server(s) 108 may receive the webpage data 104 and generate one or more aliases 112(1) that correspond to the nodes of the webpage data 104. For example, each node within the webpage data 104 may be referenced by a set of aliases 112(1), each of which corresponds to at least one relationship between the node and at least one other node. Continuing the example, an alias 112(1) for a webpage node may indicate that the node is a child of a particular node, a child of multiple particular nodes, a parent of a particular node, a parent of multiple particular nodes, a sibling of a particular node, a sibling of multiple particular nodes, one or more other, more distant relationships (e.g., grandparent, child, cousin, etc.) with one or more particular nodes, and any combinations of these relationships. The alias module 110 may generate a set of aliases 112(1) that corresponds to each node of the webpage data 104. In some implementations, one or more aliases 112(1) may also indicate a script element, such as a JavaScript component. In other implementations, an alias 112(1) may also indicate at least a portion of a URL associated with a webpage.

Aliases 112 may also have been previously generated for other webpage data 104 that was processed by the alias module 110 to form the clusters 102. For example, a first cluster 102(1) may include a set of aliases 112(2) associated with the webpages that are included within the first cluster 102(1). Continuing the example, each webpage included in the first cluster 102(1) may have one or more nodes, and each node of each webpage may have one or more associated aliases 112(1). The nodes or aliases 112(2) of the webpages in the first cluster 102(1) may be sufficiently similar, such that the webpages in the first cluster 102(1) have similar layout characteristics. Similarly, the second cluster 102(2) may include a set of aliases 112(3) associated with the webpages that are included within the second cluster 102(2).

A correspondence module 114 associated with the grouping server(s) 108 may determine correspondence between the aliases 112(1) associated with the webpage data 104 and the aliases 112(2) associated with the first cluster 102(1) by determining a set of matching aliases 116(1) that are common to both the webpage data 104 and the first cluster 102(1). For example, the webpage data 104 may include certain nodes associated with values to be extracted and certain other nodes associated with dynamic content. If the first cluster 102(1) includes webpages having nodes that correspond to those in the webpage data 104 associated with values to be extracted, then the webpage data 104 may represent a webpage having similar layout characteristics to those of the first cluster 102(1). Similarly, the correspondence module 114 may determine correspondence between the aliases 112(1) associated with the webpage data 104 and the aliases 112(3) associated with the second cluster 102(2) to determine a set of matching aliases 116(2). While FIG. 1 depicts two existing clusters 102 for illustrative purposes, correspondence may be determined between the aliases 112(1) associated with the webpage data 104 and any number of existing clusters 102. If no existing clusters 102 are present, the webpage associated with the webpage data 104 may be included as the first webpage in a new cluster 102.

A grouping module 118 associated with the grouping server(s) may determine whether the matching aliases 116 associated with the webpage data 104 and a particular cluster 102 exceed one or more threshold values, indicated by threshold data 120. For example, the threshold data 120 may indicate a minimum threshold value of 60 percent correspondence between the aliases 112(1) of the webpage data 104 and the aliases 112 of a cluster 102. If the aliases 112(1) of the webpage data 104 correspond to those of the first cluster 102(1) by at least the threshold value indicated in the threshold data 120, but do not correspond to those of the second cluster 102(2) by at least the threshold value, the grouping module 118 may associate the webpage data 104 with the first cluster 102(1). If the aliases 112(1) of the webpage data 104 correspond to those of the second cluster 102(2) by at least the threshold value, but do not correspond to those of the first cluster 102(1) by at least the threshold value, the grouping module 118 may associate the webpage data 104 with the second cluster 102(2). If the aliases 112(1) of the webpage data 104 do not correspond to those of any existing cluster 102 by at least the threshold value, the grouping module 118 may generate a new cluster 102 and associate the webpage data 104 with the new cluster 102. If the aliases 112(1) of the webpage data 104 correspond to the aliases 112 of multiple clusters 102 by at least the threshold value, the grouping module 118 may determine the particular cluster 102 having the greatest correspondence with the webpage data 104 and include the webpage data 104 with the particular cluster 102. The grouping module 118 may generate a grouping determination 122 indicative of the cluster 102 with which the webpage data 104(1) is associated.

In some implementations, the grouping module 118 may access weight data 124. The weight data 124 may associate a weight or other type of value with one or more of the aliases 112(1) based on characteristics of the alias(es) 112(1). For example, aliases 112(1) that include JavaScript elements may have a greater weight value than aliases 112(1) associated with relationships between HTML nodes. Continuing the example, if multiple nodes of different webpages include the same script elements, this may indicate that the layout characteristics of the webpages are similar. As another example, aliases 112(1) that are associated with relationships between HTML nodes may have a greater weight value than aliases 112(1) associated with URL identifiers. As yet another example, aliases 112(1) associated with certain types of node relationships, such as direct parent or child relationships, may have a greater weight value than aliases 112(1) associated with more distant relationships, such as sibling or grandparent relationships. The weight data 124 may be used to determine values associated with the matching aliases 116, which may in turn enable the grouping module 118 to determine whether the values associated with the correspondence between webpage data 104 and a cluster 102 exceed a value indicated in the threshold data 120.

The system 100 of FIG. 1 may be used to associate multiple webpages of a website with various clusters 102. Subsequently, a single extraction path or algorithm may be used to extract data from selected nodes of each webpage within a particular cluster 102. If the data extraction algorithm does not successfully extract data from each webpage within a cluster 102, the process to associate webpage data 104 for various webpages into clusters 102 may be repeated using a higher threshold value to cause a larger number of clusters 102 to be generated. If the data extraction algorithm results in the formation of a large count of clusters 102 in excess of a threshold count, the process may be repeated using a lower threshold value to cause a larger number of webpages to be included in each cluster 102 and a smaller count of clusters 102 to be formed.

Figure 2:
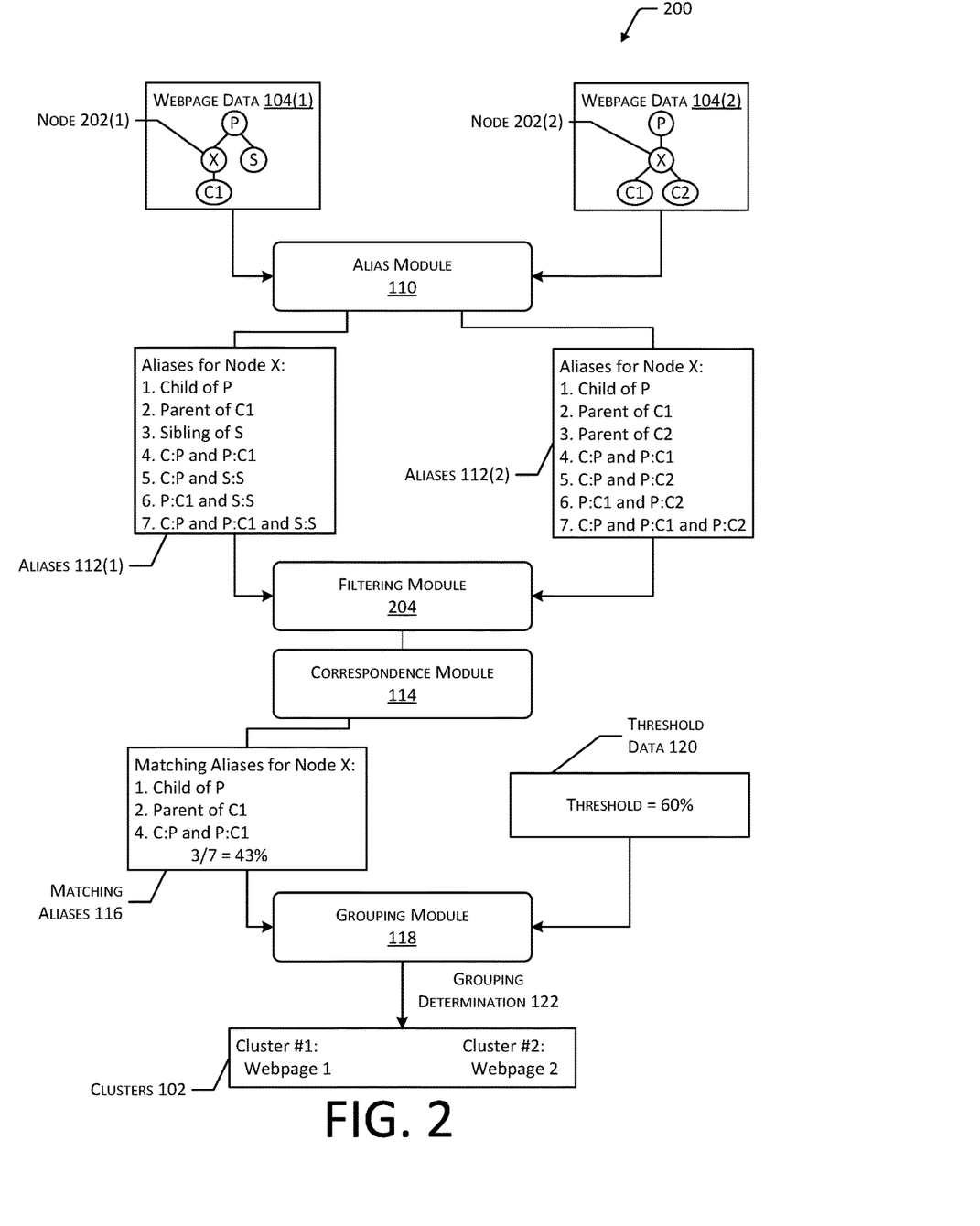
FIG. 2 depicts an implementation of a system for determining common characteristics between webpage data to group webpages into clusters having common layout characteristics.

FIG. 2 depicts an implementation of a system 200 for determining common characteristics between webpage data 104 to group webpages into clusters 102 having common layout characteristics. For example, FIG. 2 depicts first webpage data 104(1) corresponding to a first webpage and second webpage data 104(2) corresponding to a second webpage. As described with regard to FIG. 1, webpage data 104 may be represented as a series of nodes 202, such as nodes within a DOM tree structure. For example, the first webpage data 104(1) may include a particular node 202(1) "X", that may be related to one or more other nodes 202. Continuing the example, the node 202(1) "X" may be a child of a parent node "P", a parent of a child node "C1", and a sibling of a sibling node "S". The second webpage data 104(2) may also include a particular node 202(2) "X", but may also include one or more additional nodes 202 not present in the first webpage data 104(1) or may not include one or more nodes 202 that are present in the first webpage data 104(1). For example, the node 202(2) "X" in the second webpage data 104(2) may be a child of a parent node "P", a parent of a child node "C1", a parent of a child node "C2", and may lack any sibling nodes. While FIG. 2 depicts example webpage data 104 that includes four nodes 202, in other implementations, webpage data 104 corresponding to a webpage may include any number of nodes 202 having any type of relationships with other nodes 202.

An alias module 110 may determine a set of aliases 112(1) that correspond to the node 202(1) within the first webpage data 104(1). For example, each alias 112(1) may reference the node 202(1) based on a relationship of the node 202(1) to at least one other node in the webpage data 104(1). For example, the set of aliases 112(1) shown in FIG. 2 indicates seven example aliases 112(1) for the node 202(1) of the first webpage data 104(1). Continuing the example, the node 202(1) "X" may be referenced as 1) A child of parent node "P"; 2) A parent of child node "C1"; 3) A sibling of sibling node "S"; 4) A child of parent node "P" and a parent of child node "C1"; 5) A child of parent node "P" and a sibling of sibling node "S"; 6) A parent of child node "C1" and a sibling of sibling node "S"; and 7) A child of parent node "P", a parent of child node "C1", and a sibling of sibling node "S".

The alias module 110 may also determine a set of aliases 112(2) that correspond to the node 202(2) within the second webpage data 104(1). For example, the second set of aliases 112(2) may indicate that the node 202(2) is 1) A child of parent node "P"; 2) A parent of child node "C1"; 3) A parent of child node "C2"; 4) A child of parent node "P" and a parent of child node "C1"; 5) A child of parent node "P" and a parent of child node "C2"; 6) A parent of child node "C1" and a parent of child node "C2"; and 7) A child of parent node "P", a parent of child node "C1", and a parent of child node "C2".

While FIG. 2 illustrates example aliases 112 for a single node 202(1) "X" in the first webpage data 104(1) and a corresponding node 202(2) "X" in the second webpage data 104(2), the process of determining aliases 112 may be performed for each node 202 within each webpage data 104. In some implementations, the particular nodes 202 for which aliases 112 are determined may be determined based on user input. For example, a user may select particular portions of a webpage or particular nodes 202 within webpage data 104, and the alias module 110 may determine aliases 112 that correspond to the selected nodes 202. In other implementations, the alias module 110 may generate aliases 112 corresponding to every node 202 within webpage data 104. In still other implementations, the alias module 110 may generate aliases 112 for nodes 202 having specific preselected characteristics, such as nodes 202 having certain types or quantities of relationships, certain names, certain values, ranges of values, or types of values, certain types of data, and so forth.

A correspondence module 114 may determine correspondence between the aliases 112(1) associated with the first webpage data 104(1) and the aliases 112(2) associated with the second webpage data 104(2). For example, the correspondence module 114 may determine matching aliases 116 that are common between the first set of aliases 112(1) and the second set of aliases 112(2). Continuing the example, both the first node 202(1) "X" and the second node 202(2) "X" are a child of a parent node "P" and a parent of a child node "C1". Thus, the aliases 112 that reference the first and second nodes 202 as a child of "P", a parent of "C1", and both a child of "P" and a parent of "C1" are matching aliases 116 common to both the first webpage data 104(1) and the second webpage data 104(2). However, because the second webpage data 104(2) does not include the sibling node "S", aliases 112(1) for the first node 202(1) that reference the sibling node "S" are not included in the aliases 112(2) associated with the second webpage data 104(2). Similarly, because the first webpage data 104(1) does not include the child node "C2", aliases 112(2) for the second node 202(2) that include the child node "C2" are not included in the aliases 112(1) associated with the first webpage data 104(1).

While FIG. 2 depicts the correspondence module 114 determining matching aliases 116 between first webpage data 104(1) and second webpage data 104(2), in other implementations, the aliases 112 associated with webpage data 104 may be matched with the aliases 112 associated with any number of other webpages. For example, as described with regard to FIG. 1, the aliases 112 associated with a webpage may be compared with the aliases 112 associated with one or more existing clusters 102 of webpages to determine whether the received webpage data 104 may be included in the existing cluster 102.

In some implementations, a filtering module 204 may exclude one or more aliases 112 from consideration by the correspondence module 114. For example, a particular node 202, such as the child node C2, may include a value that is common to at least a threshold percentage of webpages within a website. Continuing the example, a particular node 202 that includes the same text string, that is present in at least 90 percent of the webpages within a website, may represent a header, title, company name, or other information that is not useful for determining similarities and differences between webpages. In such a case, each alias that includes a node 202 that is determined to be common to a large portion of the webpages may be excluded from consideration by the correspondence module 114.

A grouping module 118 may determine correspondence between the matching aliases 116 and threshold data 120. For example, the threshold data 120 may include a minimum threshold value indicative of a portion, count, or percentage of aliases 112 that must be common to two webpages to associate the two webpages with the same cluster 102. Continuing the example, the threshold data 120 may indicate a minimum threshold value of 60 percent, such that if the matching aliases 116 between two webpages include at least 60 percent of the total count of aliases 112 of the webpages, the webpages may be included in the same cluster 102. However, if the matching aliases 116 are less than the amount indicated in the threshold data 120, the webpages may be associated with different clusters 102.

For example, FIG. 2 illustrates the grouping module 118 determining that the matching aliases 116 include 43 percent of the total aliases 112. Continuing the example, the first webpage data 104(1) and second webpage data 104(2) share three matching aliases 116 from among seven total aliases. FIG. 2 also illustrates the threshold data 120 including a minimum threshold value of 60 percent. Because the percentage of aliases 112 that are common to both websites is less than the threshold minimum value, the grouping module 118 may generate a grouping determination 122 that associates the first webpage data 104(1) with a first cluster 102 and the second webpage data 104(2) with a different cluster 102.

Figure 3:
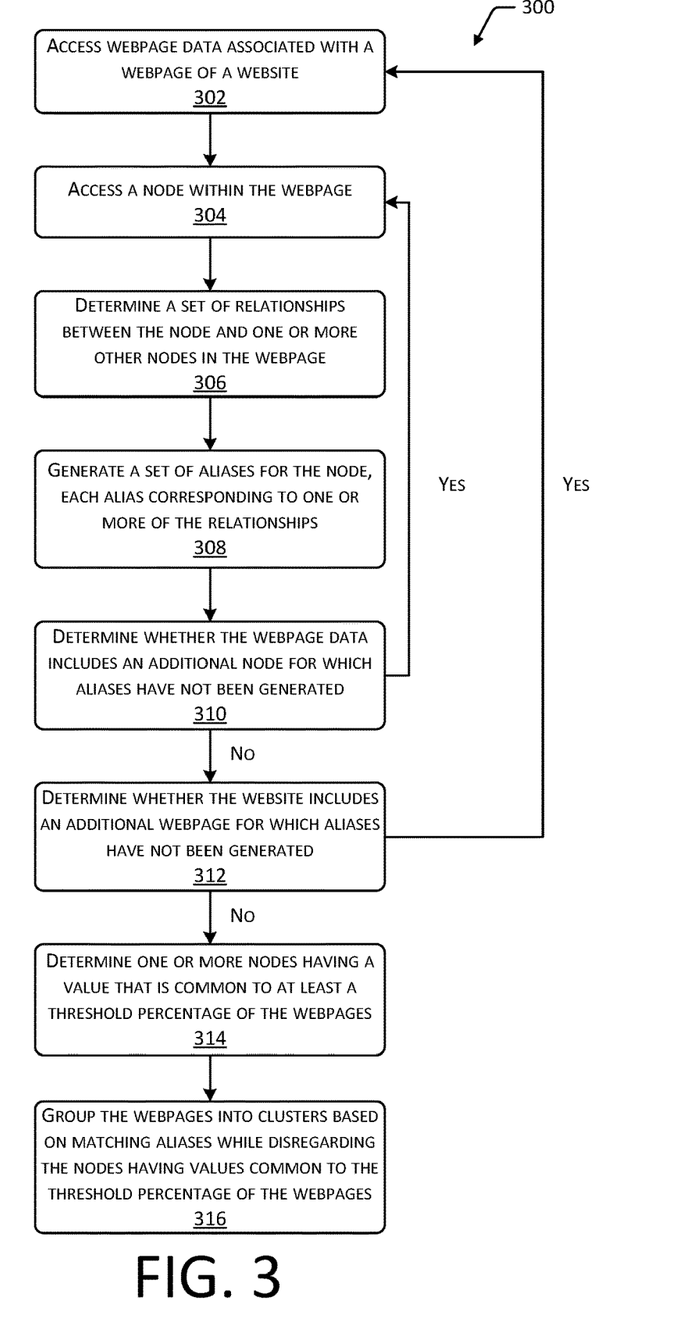
FIG. 3 is a flow diagram illustrating a method for generating aliases based on the relationships between nodes in webpage data.

FIG. 3 is a flow diagram 300 illustrating a method for generating aliases 112 based on the relationships between nodes 202 in webpage data 104. Block 302 accesses webpage data 104 associated with a webpage of a website. As described with regard to FIGS. 1 and 2, a website may include multiple webpages, some of which may have similar layout characteristics to those of other webpages. If a webpage is sufficiently similar to another webpage, then the same path, algorithm, or other extraction tool may be useable to locate a particular node 202 within each of the webpages and extract values from the nodes 202. Webpage data 104 may include data that may be processed, such as by a browser, to cause presentation of the webpage.

Block 304 accesses a node 202 within the webpage. As discussed with regard to FIGS. 1 and 2, the webpage data 104 may include nodes 202, such as HTML elements or other types of elements, such as JavaScript elements or URL identifiers. For example, a node 202 may include a position within a DOM tree structure in which HTML data is stored. Each node 202 may be related to one or more other nodes 202. For example, a HTML node 202 may have one or more parent, child, or sibling relationships, or more distant relationships, with at least one other node 202 within a webpage. The relationships between a particular node 202 and other nodes 202 may be used to locate the particular node 202. For example, a particular node 202 may be located using a path that identifies one or more relationships between the particular node 202 and at least one other node 202.

Continuing the example, block 306 determines a set of relationships between the accessed node 202 and one or more other nodes 202 in the webpage. For example, a particular node 202 may be a parent of one or more child nodes, a child of one or more parent nodes, a sibling of one or more nodes, and so forth. In some implementations, the relationships that are determined may be limited to a threshold distance from the particular node 202 or a threshold relationship level relative to the particular node 202. For example, block 306 may only determine parent-child relationships associated with the particular node 202. As another example, block 306 may only determine direct parent and direct child relationships, and first-level sibling relationships with respect to the particular node 202.

Block 308 generates a set of aliases 112 for the node 202, each alias 112 corresponding to one or more of the relationships. For example, an alias 112 for a particular node 202 may include an expression of one or multiple relationships between the particular node 202 and at least one other node 202. Continuing the example, a set of aliases 112 may describe each possible combination of relationships determined in block 306. In some implementations, the generation of aliases 112 may be limited to aliases 112 that correspond to a particular level or type of relationship or a particular distance from the particular node 202. In other implementations, the aliases 112 may be limited to a selected number of relationships. In still other relationships, the aliases 112 may be limited to a threshold count of aliases 112.

After generating the aliases 112 for a particular node 202, block 310 may determine whether the webpage data 104 includes an additional node 202 for which aliases 112 have not been generated. If the webpage data 104 includes at least one additional node 202, blocks 304 through 308 may be repeated for the additional node 202. Then block 310 may determine whether the webpage data 104 includes yet another node 202. Blocks 306 through 310 may be repeated until each node 202 within webpage data 104 has been analyzed. In some implementations, only a subset of the nodes 202 in a webpage may be analyzed. For example, the process described with regard to FIG. 3 may be limited to particular nodes 202 selected via user input, nodes 202 that include particular types of data, and so forth.

After aliases 112 have been generated for each node 202 within webpage data 104, block 312 may determine whether the website includes an additional webpage for which aliases 112 have not been generated. If an additional webpage exists, blocks 302 through 310 may be repeated for the additional webpage. For example, at block 302, webpage data 104 associated with the additional webpage may be accessed, so that nodes 202 and node relationships may be determined for the generation of aliases 112.

If no additional webpage exists, in some implementations, block 314 may determine one or more nodes 202 having a value that is common to at least a threshold percentage of the webpages within the website. For example, ninety percent of the webpages within a website may include a node 202 that contains an alphanumeric string identifying a company, such as a webpage header or footer. Nodes 202 having a value that is common to a large portion of the webpages within a website may not be useful when differentiating the webpages based on the layout characteristics thereof. Therefore, when forming clusters 102 of webpages, one or more nodes 202 determined at block 314 may be disregarded when determining the clusters 102 with which each webpage is associated.

For example, block 316 may group the webpages into clusters 102 based on matching aliases 112, while disregarding the nodes 202 having values common to the threshold percentage of the webpages. As described with regard to FIGS. 1 and 2, grouping of webpages into clusters 102 may include determining correspondence between the aliases 112 of a particular webpage and the aliases 112 of an existing cluster 102 of webpages. If the aliases 112 of a particular webpage correspond to those of an existing cluster 102 by at least a threshold amount, the webpage may be included in the cluster 102. If the aliases 112 of the webpage do not correspond to the aliases 112 of any existing cluster 102 by at least the threshold amount, the webpage may be included in a new cluster 102. If the aliases 112 of the webpage correspond to the aliases 112 of multiple existing clusters 102 by at least the threshold amount, the webpage may be included in the cluster 102 having the aliases 112 that correspond most closely with those of the webpage.

Figure 4:
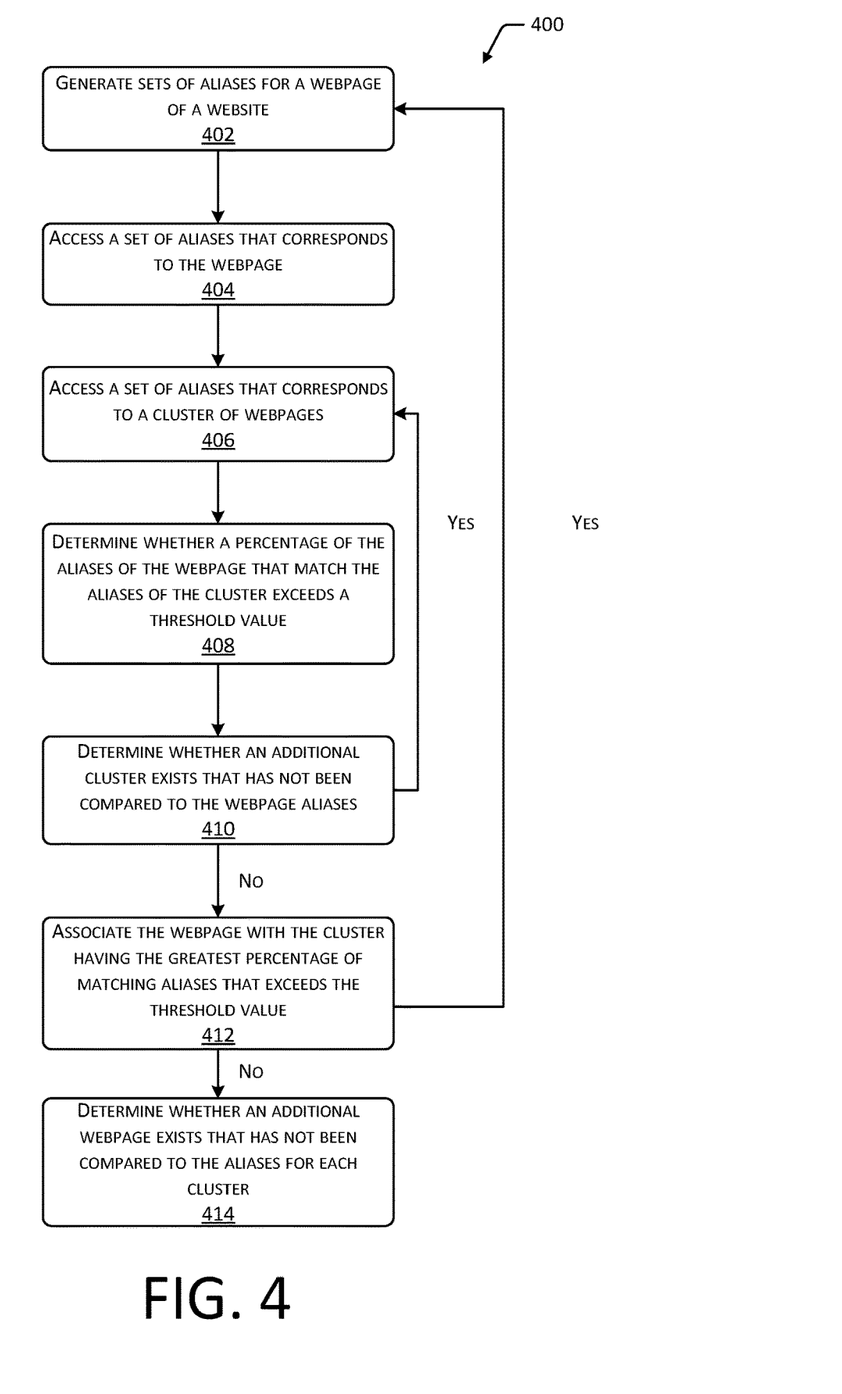
FIG. 4 is a flow diagram illustrating a method for grouping webpages into clusters based on correspondence between aliases indicative of relationships between webpage nodes.

FIG. 4 is a flow diagram 400 illustrating a method for grouping webpages into clusters 102 based on correspondence between aliases 112 indicative of relationships between webpage nodes 202. Block 402 generates sets of aliases 112 for webpage within a website. For example, as described with regard to FIGS. 1-3, a website may include multiple webpages, each webpage associated with webpage data 104. Webpage data 104 may include one or more nodes 202 that contain data, such as values that may be extracted. Each node 202 may be associated with one or more aliases 112 that correspond to at least one relationship between the node 202 and one or more other nodes 202, JavaScript elements associated with the node 202, or URL identifiers associated with the node 202. One example process by which aliases 112 may be generated for the webpages of a website is described with regard to FIG. 3.

Block 404 accesses a set of aliases 112 that corresponds to a webpage. For example, a particular set of aliases 112 may be associated with each of the nodes 202 contained within a single webpage. Continuing the example, the set of aliases 112 may include individual groups of aliases, each of which relates to a single node 202. A group of aliases may describe each possible combination of relationships between the node 202 and one or more other nodes 202. In other implementations, the aliases 112 for a node 202 may be limited to particular relationship distances, levels of relationships, or a threshold count of aliases 112. In some implementations, one or more of the aliases 112 may be associated with a weight value. For example, aliases 112 that include JavaScript elements may have a greater weight value than aliases 112 associated with relationships between HTML nodes 202. As another example, aliases 112 that are associated with relationships between HTML nodes 202 may have a greater weight value than aliases 112 associated with URL identifiers. As yet another example, aliases 112 associated with certain types of node relationships, such as direct parent or child relationships, may have a greater weight value than aliases 112 associated with more distant relationships, such as sibling or grandparent relationships.

Block 406 accesses a set of aliases 112 that corresponds to a cluster 102 of webpages. As described with regard to FIG. 1, a cluster 102 of webpages may include webpages having common aliases 112 in excess of a threshold value. For example, multiple webpages in which 60 percent of the aliases 112 associated with the webpage, or another threshold value, match aliases 112 of the other webpages in the cluster 102 may be grouped together. In cases where the particular webpage accessed in block 404 is the first webpage of a website that is analyzed and no clusters 102 of webpages exist, blocks 406 through 412 may be omitted and a new cluster 102 may be generated that includes the particular webpage.

Block 408 determines whether a percentage of the aliases 112 of the webpage that match the aliases 112 of the cluster 102 exceed a threshold value. For example, threshold data 120 may indicate a count of aliases 112, a percentage of aliases 112, or another type of value. If the count or percentage of the aliases 112 of a particular webpage that match the aliases 112 of the cluster 102 exceed the threshold value, this may indicate that the particular webpage includes layout characteristics identical or similar to those of the webpages associated with the cluster 102.

Block 410 determines whether an additional cluster 102 exists that has not been compared to the webpage aliases 112. For example, if multiple clusters 102 of webpages have been previously generated, blocks 406 and 408 may be repeated until the aliases 112 for the webpage have been compared to the aliases of each existing cluster 102.

Block 412 associates the webpage with the cluster 102 having the greatest percentage of matching aliases 116 that exceeds the threshold value. For example, if the aliases 112 of the webpage match those of a single cluster 102, to an extent that exceeds the threshold value, the webpage may be associated with the cluster 102. However, if the aliases of the webpage match those of multiple clusters 102 to an extent that exceeds the threshold value, the webpage may be associated with the cluster 102 having aliases that correspond more closely to those of the webpage. For example, if the webpage has a greater count or percentage of matching aliases 116 that correspond to a first cluster 102(1) than the correspondence between the webpage aliases 112 and a second cluster 102(2), the webpage may be associated with the first cluster 102(1). In other implementations, if the aliases 112 of the webpage do not correspond to those of any existing cluster 102 to an extent that exceeds the threshold value, or if no clusters 102 currently exist, a new cluster 102 may be generated and the webpage may be associated with the new cluster 102.

Block 414 determines whether an additional webpage exists that has not been compared to the aliases 112 for each cluster 102. For example, if a website includes multiple webpages and an additional webpage has not yet been analyzed using the process depicted in FIG. 4, blocks 402 through 412 may be repeated with regard to a subsequent webpage. The process depicted in blocks 402 through 414 may be repeated until each webpage of a website has been associated with a cluster 102. In some implementations, the process shown in FIG. 4 may be limited to particular webpages within a website, such as webpages selected via user input. In other implementations, the process of FIG. 4 may be limited to a particular type or category of webpage, webpages having certain nodes 202 or certain types of data, and so forth.

Figure 5:
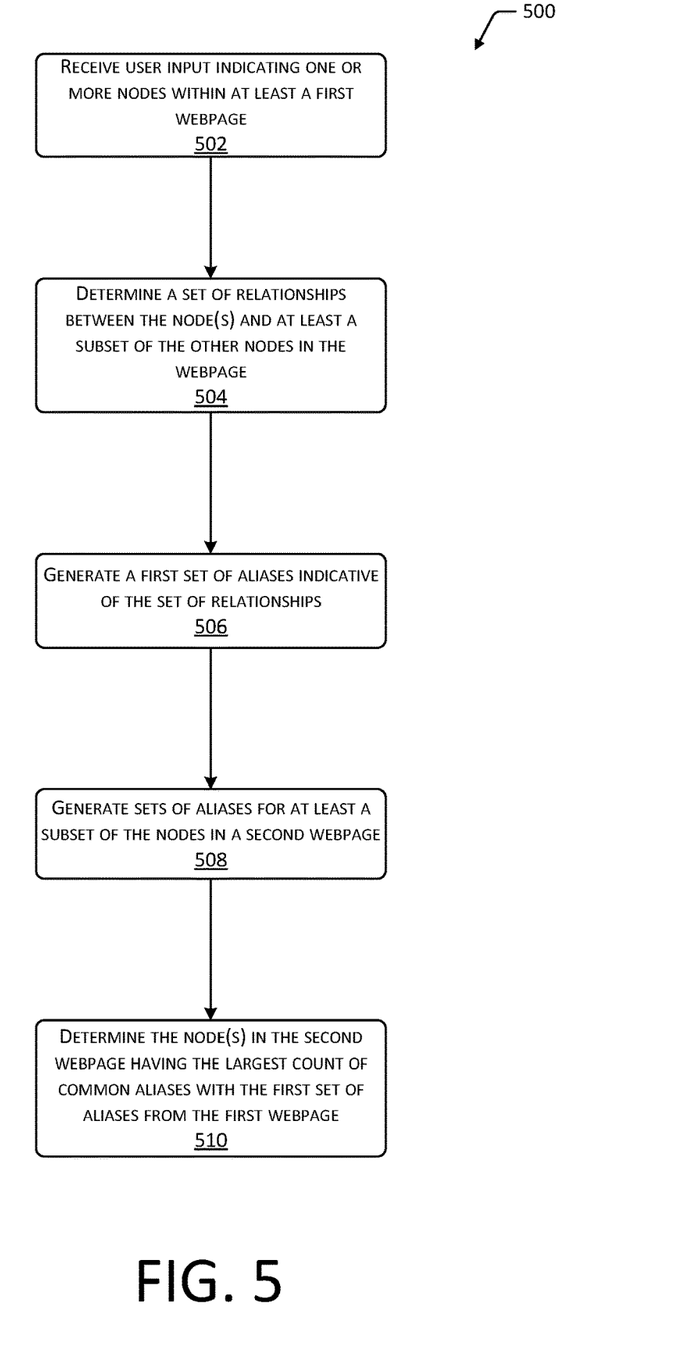
FIG. 5 is a flow diagram illustrating a method for locating target nodes in a second webpage based on the relationships between selected target nodes in a first webpage and other nodes in the first webpage.

FIG. 5 is a flow diagram 500 illustrating a method for locating target nodes 202 in a second webpage based on the relationships between selected target nodes 202 in a first webpage and other nodes 202 in the first webpage. Block 502 receives user input indicating one or more nodes 202 within at least a first webpage. For example, a webpage may be presented to a user, or webpage data 104 associated with the webpage may be presented. The user may indicate specific elements of the webpage or specific nodes 202 within the webpage data 104 via use input. For example, a user viewing a webpage associated with an item available for purchase may select elements on the webpage that indicate a product name, a price, and various technical specifications of the item. In some implementations, the user may view and select nodes 202 from multiple webpages.

Block 504 determines a set of relationships between the selected node(s) 202 and at least a subset of the other nodes 202 in the webpage. For example, each node 202 that corresponds to an element selected via user input may be related to at least one other node 202 of the webpage. In some implementations, the relationships between the selected node(s) 202 and only a portion of the other nodes 202 in the webpage may be determined. For example, for a target node 202 selected via user input, the relationships between the target node 202 and each node 202 within a path between the target node 202 and a source node 202. Continuing the example, the target node 202 may include a HTML element while the source node 202 includes a parent document that contains the HTML element, and in some cases, one or more other elements related to the HTML element. In other implementations, the particular relationships that are determined may be affected by the node(s) 202 selected via user input. For example, the levels of the relationships to be determined may be selected based on the particular nodes 202 selected by the user or the webpages that contain the nodes 202.

Block 506 generates a first set of aliases 112 indicative of the set of relationships determined in block 504. As described with regard to FIGS. 1-4, aliases 112 for a node 202 may include an indication of a relationship or a combination of multiple relationships between the node 202 and one or more other nodes 202. In some implementations, an indication of one or more aliases 112 may be output to a user as user input selecting particular nodes 202 is received.

Block 508 generates sets of aliases 112 for at least a subset of the nodes 202 in a second webpage. One possible process by which aliases 112 for nodes 202 may be generated is described with regard to FIG. 3. Block 510 then determines the node(s) 202 in the second webpage having the largest count of common aliases 112 with the first set of aliases 112 from the first webpage(s). For example, if two nodes 202 on different webpages share a large number of common aliases 112, this may indicate that the nodes 202 are identical or similar. In some implementations, block 510 may determine multipole nodes 202 that correspond to at least a threshold number of the first set of aliases 112. For example, nodes 202 of the second webpage may be ranked based on the count of matching aliases 116 between those of the node(s) 202 in the second webpage and those of the nodes 202 in the first webpage. An output indicating the node(s) 202 having the greatest correspondence with the selected node(s) 202, or indicating the rank of one or more nodes 202 in the second webpage may be provided to the user, responsive to which a user may generate a path, algorithm or other type of data extraction tool to access the corresponding nodes 202.

Figure 6:
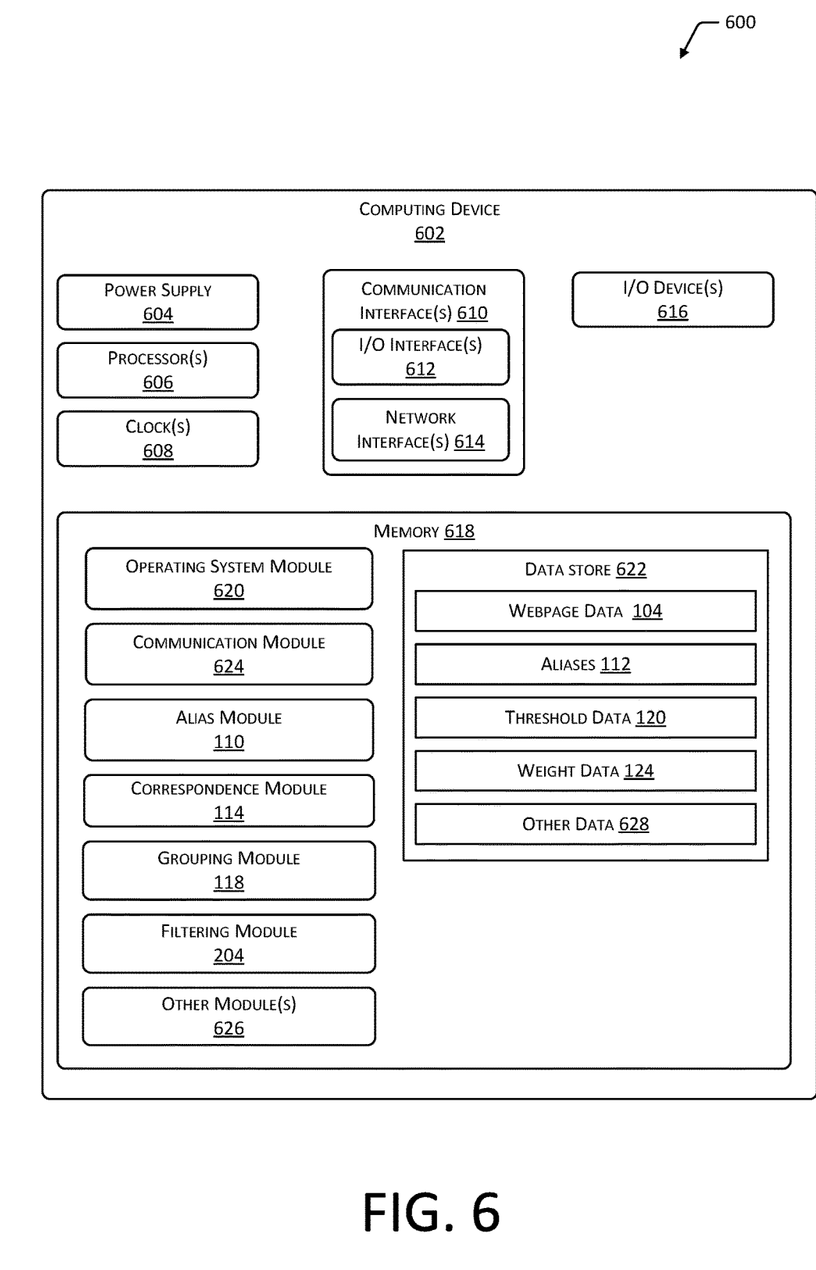
FIG. 6 is a block diagram illustrating a computing device within the scope of the present disclosure.

FIG. 6 is a block diagram 600 illustrating a computing device 602 within the scope of the present disclosure. While FIG. 6 depicts a single computing device 602, in other implementations, the functions described with regard to the computing device 602 may be performed by any number and any type of computing devices 602. For example, the computing device 602 may include one or more webpage servers 106, grouping servers 108, or other computing devices 602 in communication therewith.

One or more power supplies 604 may be configured to provide electrical power suitable for operating the computing device 602. In some implementations, the power supply 604 may include a rechargeable battery, fuel cell, photovoltaic cell, power conditioning circuitry, and so forth.

The computing device 602 may include one or more hardware processor(s) 606 (processors) configured to execute one or more stored instructions. The processor(s) 606 may include one or more cores. One or more clocks 608 may provide information indicative of date, time, ticks, and so forth. For example, the processor(s) 606 may use data from the clock 608 to generate a timestamp, trigger a preprogrammed action, and so forth.

The computing device 602 may include one or more communication interface(s) 610, such as input/output (I/O) interface(s) 612, network interface(s) 614, and so forth. The communication interfaces 610 may enable the computing device 602, or components of the computing device 602, to communicate with other computing devices 602 or components thereof. The I/O interface(s) 612 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 612 may couple to one or more I/O device(s) 616. The I/O devices 616 may include any manner of input device or output device associated with the computing device 602 or with another computing device 602 in communication therewith. For example, I/O devices 616 may include touch sensors, keyboards, mouse devices, microphones, image sensors (e.g., cameras), scanners, displays, speakers, haptic devices, printers, motion sensors, location sensors, and so forth. In some implementations, the I/O device(s) 616 may be physically incorporated with a computing device 602 or may be externally placed.

The network interface(s) 614 may be configured to provide communications between the computing device 602 and other devices, such as the I/O devices 616, routers, access points, and so forth. The network interface(s) 614 may include devices configured to couple to one or more networks, including local area networks (LANs), wireless LANs, wide area networks (WANs), wireless WANs, and so forth. For example, the network interfaces 614 may include computing devices 602 compatible with Ethernet, Wi-Fi, Wi-Fi Direct, Bluetooth, Bluetooth Low Energy, ZigBee, Z-Wave, 3G, 4G, LTE, and so forth.

The computing device 602 may include one or more busses or other internal communications hardware or software that allows for the transfer of data between the various modules and portions of the computing device 602.

As shown in FIG. 6, the computing device 602 may include one or more memories 618. The memory 618 may include one or more computer-readable storage media (CRSM). The CRSM may be any one or more of an electronic storage medium, a magnetic storage medium, an optical storage medium, a quantum storage medium, a mechanical computer storage medium, and so forth. The memory 618 may provide storage of computer-readable instructions, data structures, program modules, and other data for the operation of the computing device 602. A few example modules are shown stored in the memory 618, although the same functionality may alternatively be implemented in hardware, firmware, or as a system on a chip (SoC).

The memory 618 may include one or more operating system (OS) modules 620. The OS module 620 may be configured to manage hardware resource devices such as the I/O interfaces 612, the network interfaces 614, the I/O devices 616, and to provide various services to applications or modules executing on the processors 606. The OS module 620 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 622 and one or more of the following modules may also be stored in the memory 618. The modules may be executed as foreground applications, background tasks, daemons, and so forth. The data store 622 may use a flat file, database, linked list, tree, executable code, script, or other data structure to store information. In some implementations, the data store 622 or a portion of the data store 622 may be distributed across one or more other devices including other computing devices 602, network attached storage devices, and so forth.

The memory 618 may include a communication module 624, which may be configured to establish communications with other computing devices 602.

The memory 618 may also store the alias module 110. The alias module 110 may be configured to determine relationships between a particular node 202 within webpage data 104 and one or more other nodes 202 and generate aliases 112 indicative of particular relationships or combinations of relationships. In some implementations, threshold data 120 may indicate relationship distances, levels of relationships, types of relationships, or types of nodes 202 that may be disregarded when generating aliases 112, or that may be included when generating aliases 112 while other types of relationships are disregarded. Additionally, in some implementations, relationships that are represented by aliases 112 may include the presence or absence of JavaScript elements or other types of script elements, at least a portion of a URL identifier associated with a webpage, and one or more relationships between HTML elements of the webpage. In some cases, the threshold data 120 may indicate weight values to be associated with each type of alias 112. For example, JavaScript elements may have a greater weight than HTML relationships, which may have a greater weight value than URL identifiers. In some cases, certain types of HTML relationships, such as direct parent-child relationships, may have a greater weight value than more distant relationships between nodes 202.

The memory 618 may also store the correspondence module 114. The correspondence module 114 may determine correspondence between a set of aliases 112 associated with a webpage and one or more other sets of aliases 112 associated with other webpages or clusters 102 of webpages. For example, the correspondence module 114 may determine a set of matching aliases 116 that are common to a webpage and an existing cluster 102 of webpages.

The memory 618 may additionally store the grouping module 118. The grouping module may determine correspondence between sets of matching aliases 116 between a webpage and an existing cluster 102 or other webpage and threshold data 120. For example, the threshold data 120 may indicate a threshold minimum percentage, such as 60 percent. If the matching aliases 116 between a webpage and an existing cluster 102 of webpages represent a greater percentage of the total aliases 112 for a webpage than the threshold minimum percentage, the webpage may be included in the cluster 102. In some implementations, the threshold data 120 may indicate a threshold count of aliases 112. The threshold data 120 may also indicate a threshold maximum percentage. For example, in some implementations, one or more of the correspondence module 114 or the grouping module 118 may determine that a particular node 202 or alias 112 is common to at least a threshold maximum percentage of webpages. This determination may indicate that the node 202 or alias is not useful for differentiating webpages into clusters 102. For example, a node 202 that is common to every webpage in a website may include a header, footer, company name, or other information that is generic to multiple webpages. Responsive to such a determination, the nodes 202 that are common to at least the threshold maximum percentage of webpages may be disregarded.

Other modules 626 may also be present in the memory 618. For example, other modules 626 may include user input modules for receiving selection of nodes 202 or elements of a presented webpage, changing threshold values, and so forth. Other modules 626 may also include encryption modules to encrypt and decrypt communications between computing devices 602.

Other data 628 within the data store 622 may include default configurations and settings associated with computing devices 602. Other data 628 may also include security data, such as encryption keys and schema, access credentials, and so forth. Other data 628 may further include rules and algorithms associated with extraction of values from nodes 202, weighting of different types of aliases 112, and so forth.

In different implementations, different computing devices 602 may have different capabilities or capacities. For example, processor 606 capability and memory 618 capacity of servers may be greater than the processor 606 capability and memory 618 capacity of personal or portable computing devices 602.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   determining a first plurality of relationships, wherein each relationship of the first plurality of relationships is between a first node of a first webpage of a plurality of webpages and a single second node of a plurality of second nodes of the first webpage;
   generating a plurality of first aliases for the first node, wherein each alias of the plurality of first aliases is indicative of a subset of the first plurality of relationships;
   determining a second plurality of relationships, wherein each relationship of the second plurality of relationships is between a third node of a second webpage of the plurality of webpages and a single fourth node of a plurality of fourth nodes of the second webpage;
   generating a plurality of second aliases for the third node, wherein each alias of the plurality of second aliases is indicative of a subset of the second plurality of relationships;

determining a value indicative of correspondence between a first subset of the plurality of first aliases and a second subset of the plurality of second aliases, wherein the value indicates an association between the first webpage and the second webpage and a group of webpages having common layout characteristics; and generating an output indicating that the first webpage and the second webpage are associated with the group of webpages.

2. The method of claim 1, further comprising:
determining that the subset of the first plurality of relationships has a threshold distance from the first node, wherein each first alias of the plurality of first aliases corresponds to a respective relationship of the subset.

3. The method of claim 1, further comprising:
determining that the subset of the first plurality of relationships includes a count of relationships less than a threshold count; and
generating a count of the plurality of first aliases that is less than or equal to the threshold count.

4. The method of claim 1, further comprising:
determining that a first script element in the first webpage matches a second script element in the second webpage within a threshold tolerance;
wherein the first webpage and the second webpage are further associated with the group responsive to the first script element matching the second script element.

5. The method of claim 1, further comprising:
determining that at least a portion of a first locator element associated with the first webpage matches at least a portion of a second locator element associated with the second webpage within a threshold tolerance;
wherein the first webpage and the second webpage are further associated with the group responsive to the at least a portion of the first locator element matching the at least a portion of the second locator element.

6. The method of claim 1, further comprising:
extracting a first value from the first node using a path element indicative of a location of the first node within the first webpage; and
extracting a second value from the third node using the path element that was used to extract the first value from the first node.

7. A system comprising:
one or more memories storing computer-executable instructions; and
one or more hardware processors to execute the computer-executable instructions to:
access first data indicative of a first webpage of a plurality of webpages, wherein the first webpage is associated with a first plurality of nodes;
determine a first plurality of relationships, wherein each relationship of the first plurality of relationships is between a first node and a single other node of the first plurality of nodes;
generate a plurality of first aliases for the first node, wherein each alias of the plurality of first aliases is indicative of a subset of the first plurality of relationships;
access second data indicative of a second webpage of the plurality of webpages, wherein the second webpage is associated with a second plurality of nodes;
determine a second plurality of relationships, wherein each relationship of the second plurality of relationships is between a second node and a single other node of the second plurality of nodes;
generate a plurality of second aliases for the second node, wherein each alias of the plurality of second aliases is indicative of a subset of the second plurality of relationships;
determine that a threshold portion of a first subset of the plurality of first aliases matches a second subset of the plurality of second aliases, indicating that the first node of the first webpage corresponds to the second node of the second webpage;
based on the threshold portion of the first subset matching the second subset, include the first webpage and the second webpage in a cluster of webpages; and
extract a first value from the first node and a second value from the second node using an extraction module configured to extract values based on a characteristic associated with the cluster of webpages.

8. The system of claim 1, further comprising computer-executable instructions to:
access weight data that associates weight values with types of relationships represented by aliases;
determine first types of relationships of the first subset and second types of relationships of the second subset;
determine, based on correspondence between the weight data, the first types of relationships, and the second types of relationships, weight values that correspond to the first subset and the second subset; and
determine a value indicative of correspondence between the first subset and the second subset based at least in part on the weight values.

9. The system of claim 1, further comprising computer-executable instructions to:
determine node values for nodes associated with the first subset and the second subset;
determine at least a portion of the node values that are common to at least a threshold portion of the plurality of webpages; and
remove one or more aliases associated with the at least a portion of the node values from the first subset and the second subset.

10. The system of claim 1, further comprising computer-executable instructions to:
determine one or more of a first JavaScript element or a first uniform resource locator (URL) associated with the first webpage and one or more of a second JavaScript element or a second URL associated with the second webpage; and
determine that the one or more of the first JavaScript element or the first URL matches the one or more of the second JavaScript element or second URL;
wherein the first webpage and the second webpage are further included in the cluster responsive to the one or more of the first JavaScript element or the first URL matching the one or more of the second JavaScript element or the second URL.

11. A system comprising:
one or more memories storing computer-executable instructions; and
one or more hardware processors to execute the computer-executable instructions to:
determine a first set of nodes associated with a first webpage of a plurality of webpages;
determine a plurality of first relationships, wherein each relationship of the plurality of first relationships is between a first node and a single other node of the first set of nodes;

generate a plurality of first aliases, wherein each alias of the plurality of first aliases represents a subset of the plurality of first relationships;

determine a second set of nodes associated with a second webpage of the plurality of webpages;

determine a plurality of second relationships, wherein each relationship of the plurality of second relationships is between a second node and a single other node of the second set of nodes;

generate a plurality of second aliases, wherein each alias of the plurality of second aliases represents a subset of the plurality of second relationships;

determine that a first subset of the plurality of first aliases corresponds to a second subset of the plurality of second aliases with at least a threshold level of correspondence;

associate the first webpage and the second webpage with a first group of webpages; and generate an output indicative of the first group of webpages.

12. The system of claim 11, further comprising computer-executable instructions to:

determine that a count of groups associated with the plurality of webpages exceeds a threshold count; and decrease the threshold level of correspondence to cause a larger count of webpages to be included in the first group of webpages.

13. The system of claim 11, further comprising computer-executable instructions to:

extract a first value from the first node of the first webpage using a path element indicative of a location of the first node within the first webpage; and extract a second value from the second node of the second webpage using the path element that was used to extract the first value from the first node.

14. The system of claim 13, further comprising computer-executable instructions to:

determine a failure to extract one or more of the first value or the second value; and increase the threshold level of correspondence to cause one or more of the first webpage or the second webpage to be disassociated from the first group of webpages.

15. The system of claim 11, further comprising computer-executable instructions to:

access weight data that associates weight values with characteristics of nodes;

determine first characteristics of the first subset and second characteristics of the second subset;

determine, based on correspondence between the weight data, the first subset, and the second subset, weight values that correspond to the first subset and the second subset; and determine a value indicative of the correspondence, wherein the threshold level of correspondence includes a threshold value less than the value indicative of the correspondence.

16. The system of claim 11, further comprising computer-executable instructions to:

determine a node value for at least one node of the first set of nodes that is common to a threshold portion of the plurality of webpages;

wherein the computer-executable instructions to determine that the first subset corresponds to the second subset with at least the threshold level of correspondence are configured to disregard the at least one node.

17. The system of claim 11, further comprising computer-executable instructions to: determine one or more characteristics of the first set of nodes that include indications of relationships between a first node of the first set of nodes and one or more other nodes of the first set of nodes; and determine that the subset of the plurality of first relationships is indicative of a distance less than or equal to a threshold distance from the first node, wherein the first subset of the plurality of first aliases is indicative of the subset of the plurality of first relationships.

18. The system of claim 17, wherein the computer-executable instructions to determine the subset of the plurality of first relationships include computer-executable instructions to determine each possible relationship between the first node and each other node within the threshold distance of the first node.

19. The system of claim 11, further comprising computer-executable instructions to:

determine that a first subset of the first set of nodes is common to at least a threshold portion of the plurality of webpages;

wherein the plurality of first relationships is determined based on a second subset of the first set of nodes that does not include the first subset.

20. The system of claim 11, further comprising computer-executable instructions to:

determine that the plurality of first aliases corresponds to a plurality of third aliases associated with a third webpage of the plurality of webpages by at least the threshold level of correspondence, wherein the third webpage is associated with a second group of webpages; and determine that the plurality of first aliases corresponds to the plurality of second aliases with a greater level of correspondence than a level of correspondence between the plurality of first aliases and the plurality of third aliases;

wherein the first webpage and the second webpage are associated with the first group of webpages based on the greater level of correspondence.

* * * * *

UNITED STATES PATENT AND TRADEMARK OFFICE
CERTIFICATE OF CORRECTION

PATENT NO. : 10,460,018 B1  
APPLICATION NO. : 15/665006  
DATED : October 29, 2019  
INVENTOR(S) : Lohith Ravi Page 1 of 1

It is certified that error appears in the above-identified patent and that said Letters Patent is hereby corrected as shown below:

In the Claims

Claim 8, Column 20, Line 19 reads:
"8. The system of claim 1, ..."
Where it should read:
--"8. The system of claim 7,....."--

Claim 9, Column 20, Line 32 reads:
"9. The system of claim 1, ..."
Where it should read:
--"9. The system of claim 7,....."--

Claim 10, Column 20, Line 42 reads:
"10. The system of claim 1, ..."
Where it should read:
--"10. The system of claim 7,....." --

Signed and Sealed this  
Tenth Day of December, 2019

Andrei Iancu  
*Director of the United States Patent and Trademark Office*